United States Patent
Duggal et al.

(10) Patent No.: US 11,640,390 B2
(45) Date of Patent: *May 2, 2023

(54) BULK FILE VERIFICATION

(71) Applicant: EMC IP HOLDING COMPANY LLC, Hopkinton, MA (US)

(72) Inventors: Abhinav Duggal, Santa Clara, CA (US); Tony Wong, Milpitas, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/404,178

(22) Filed: Aug. 17, 2021

(65) Prior Publication Data

US 2021/0374124 A1 Dec. 2, 2021

Related U.S. Application Data

(63) Continuation of application No. 16/659,181, filed on Oct. 21, 2019, now Pat. No. 11,100,088, which is a continuation of application No. 15/195,864, filed on Jun. 28, 2016, now Pat. No. 10,452,643.

(51) Int. Cl.
| | |
|---|---|
| *G06F 16/23* | (2019.01) |
| *G06F 16/11* | (2019.01) |
| *G06F 16/22* | (2019.01) |
| *G06F 16/9535* | (2019.01) |

(52) U.S. Cl.
CPC .......... *G06F 16/2365* (2019.01); *G06F 16/11* (2019.01); *G06F 16/2246* (2019.01); *G06F 16/9535* (2019.01)

(58) Field of Classification Search
CPC ............. G06F 16/2365; G06F 16/2246; G06F 16/9535; G06F 16/11
USPC .......................................................... 707/690
See application file for complete search history.

(56) References Cited

U.S. PATENT DOCUMENTS

| | | | | |
|---|---|---|---|---|
| 8,706,701 | B1 * | 4/2014 | Stefanov | G06F 16/1824 713/160 |
| 9,367,448 | B1 * | 6/2016 | Botelho | G06F 12/0253 |
| 9,594,674 | B1 * | 3/2017 | Mondal | G06F 16/1748 |
| 9,715,505 | B1 * | 7/2017 | Mondal | G06F 16/162 |
| 9,767,106 | B1 * | 9/2017 | Duggal | G06F 11/14 |
| 2011/0283085 | A1 * | 11/2011 | Dilger | G06F 11/1004 711/216 |
| 2013/0108048 | A1 * | 5/2013 | Grube | H04L 1/0057 380/270 |

* cited by examiner

*Primary Examiner* — Dung K Chau
(74) *Attorney, Agent, or Firm* — Workman Nydegger

(57) ABSTRACT

Systems and methods for verifying files in bulk in a file system. When files are represented by a segment tree, the levels of the segment trees are walked by level such that that multiple files are verified at the same time in order to identify missing segments. Then, a bottom up scan is performed using the missing segments to identify the files corresponding to the missing segments. The missing files can then be handled by the file system.

18 Claims, 3 Drawing Sheets

BULK FILE VERIFICATION

FIELD OF THE INVENTION

Embodiments of the invention relate to systems and methods for verifying files or segments in a computing system. Embodiments of the invention further relate to systems and methods for verifying files or segments in a deduplicated file system.

BACKGROUND

In many computing systems that are intended to provide backup services, there is a need to verify that the data actually exists and is actually backed up. This can be difficult in conventional backup systems for various reasons.

For example, the data verification process in backup systems that also de-duplicate the data is complicated. Because files are often broken down into blocks or segments, the process of verifying the files may result in checking the same blocks or segments multiple times because the same data block or segment may be associated with multiple files. This wastes time and consumes computing resources. In addition, verifying the integrity of a file may result in random disk access reads because the file may not be stored contiguously on the storage device.

File verification is a process that that is regularly performed in order to ensure that the files stored in the backup systems are consistent and whole. However, conventional approaches to file verification suffer from random lookups, which slow down the verification performance, and from repeated and unnecessary segment verifications. Systems and methods are needed to improve the performance of the verification process.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for verifying files in a file system or segments of files in a file system. When one or more segments are identified as missing, the corresponding files are incomplete or corrupted. These files may need to be uploaded or replaced if they cannot be reconstituted from the remaining segments.

In one example, a file system may store files using segment trees. More specifically, the file system maintains mappings of file address space into segments using a segment tree. Embodiments of the invention effectively verify all of the files at the same time (or a group of files at the same time) by walking the segment trees. This reduces or eliminates redundancy because levels of the segment trees are being walked one at a time instead of walking all levels of one segment and then potentially walking some of the same segments when walking the levels of another segment tree. This also reduces random access reads to the memory at least because the memory may be configured such that segments of the segment trees pertaining to the same level are stored together or substantially together (e.g., in the same container).

More specifically, the segment trees may be stored in containers and segments pertaining to the same level are typically stored in the same container or the same containers. However, segments associated with different levels may still be stored in the same container in some examples. Preferably, segments from the same segment levels are stored in the same containers. When walking segments of the same level, random IO (input/output) can be reduced because the containers containing these segments can be read sequentially and data can be extracted without having to jump around in the file system. Even when there is only one segment of level L(i) per container, all the containers in the file system are still read when reading the segment level L(i), but this is still better than random IO because the containers can be read sequentially. However, in a given file system, segments of a given level L(i) are usually concentrated in a subset of the containers and all of the information for those segments can be obtained by reading that small subset of containers sequentially. By storing segments of the same level in the same containers, the number of containers to be read is reduced and the containers can be read sequentially.

Figure 1:
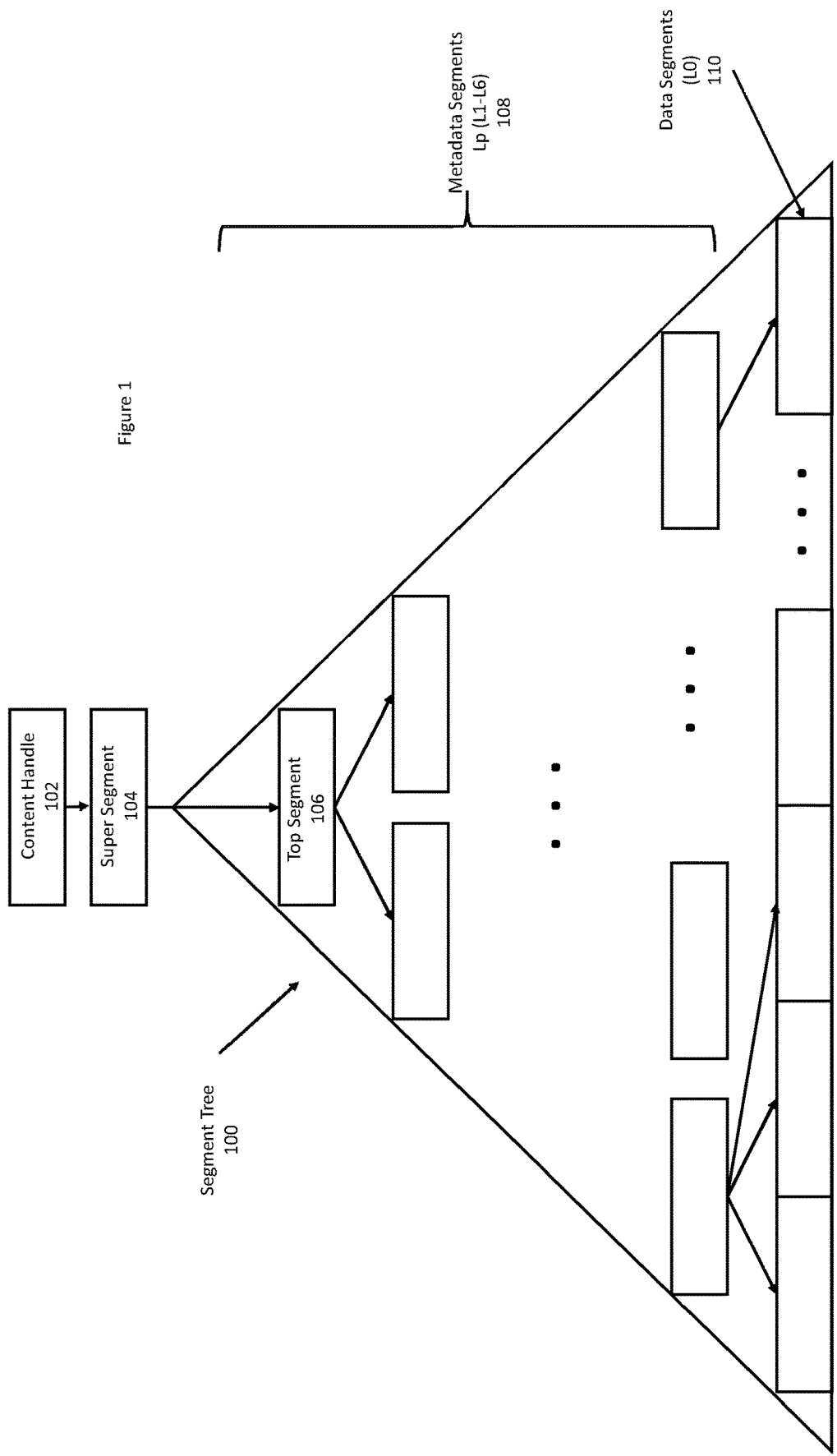
FIG. 1 illustrates an example of how files or data may be stored in a file system.

FIG. 1 illustrates an example of a segment tree that may be used in a file system. FIG. 1 illustrates a segment tree 100 that corresponds to a file (or other data representation). A content handle 102, at the top of the segment tree, represents the content of a file. The content handle 102 points to a super segment 104. The super segment 104 includes a reference to a top segment 106 of the segment tree 100 of the file.

The segment tree 100 includes, by way of example only and not by limitation, multiple levels (seven levels in this example). The levels include data segments 110 and metadata segments 108. The data segments are located in level L(0) and the metadata segments are located in levels L(1)-L(6) as illustrated in FIG. 1. L(0) is the lowest level.

Higher levels in the segment tree 100 include references to segments in lower levels in the segment tree 100. Identifiers such as keys, cryptographic hashes, and fingerprints are examples of references. Alternatively a reference may include an identifier and other metadata. L(i) segments of level i typically have references to L(i-1) segments. In one example, references are configured to uniquely identify a segment. For example, the segments in Level L(6) (e.g., the top segment 106) include references to the segments in level L(5), the segments in level L(5) include references to segments in level L(4), the segments in level L(4) include references to segments in level L(3), the segments in level L(3_include references to segments in level L(2), the segments in level L(2) include references to segments in level L(1), and the segments in level L(1) include references to segments in level L(0).

Embodiments of the invention relate to a file system architecture that ensures the integrity of data in the presence of software and hardware failures. As a part of this architecture, the file system ensures the integrity of segments, segment references and an index. The index may store the references or portion of the reference (e.g., identifier, key, hast) and may establish a relationship between the references and the locations of the segments in the containers.

In one example, segments are stored inside containers, segment references are stored in the meta-data segments and the index stores the mapping from the reference (or portion of the reference such as an identifier) to container identifiers (IDs).

Ensuring the integrity of the file system includes ensuring that references or identifiers in the index have segments corresponding to them in the containers and that segment references or identifiers stored inside metadata segments point to or identify segments inside the containers. Embodiments of the invention ensure the integrity of the file system by performing file verification (e.g., as a background activity). File verification runs inside the file system to ensure the correctness of mappings between segment references and segments and ensures that all segments in the containers are reachable from its segment references. Segments that are not reachable are missing segments in one example.

Inconsistencies between the index, segments and segment references can occur for various reasons including hardware and/or software issues. Examples of inconsistencies include, by way of example and not limitation:

a segment reference of identifier is present in the index but the segment is not present in any container;

a segment is written to a container but there is no corresponding reference or identifier in the index; and a segment is not present in the container set or represented in the index but a reference is found in the segment tree.

File verification can identify these types of errors. In one example, periodic snapshots are taken to identify the files that need to be verified. Snapshots are taken at regular intervals and files that have changed or been created are candidates for verification, although the entire file system or portion thereof could be verified.

Conventionally, file verification verifies all the segments in the segment tree by doing a depth first walk for each segment tree (e.g., from L(6) to L(0)). The approach has several limitations. First, walking a segment tree to verify the reachability of references results in random lookups in the storage (e.g., on disk or flash) because different levels of the segment trees are stored in different locations or in different containers. Random lookups affect the performance of the file verification. Second, multiple segments are verified repeatedly when the file system is de-duplicated and verified in a depth first manner.

Embodiments of the invention overcome these issues by performing bulk file verification. Embodiments of the invention verify the files by evaluating the same segment level of multiple segment trees at the same time. Because the segments of levels may be stored contiguously or consecutively in the storage (e.g., containers may include segments from the same level of the segment tree or of multiple segment trees), the storage can be read substantially sequentially and random lookups can be eliminated or reduced. Further, the likelihood of verifying the same segments multiple times is reduced.

Bulk file verification includes verifying all the segments in the file system by doing a physical scan of the container set rather than doing a logical verification for each file. In one example, the segment trees of multiple files are walked in the breadth first manner for all the files rather than a depth first manner for each file. In a breadth type scan, segments of the same level for multiple files and corresponding segment trees are scanned. This is distinct from scanning only the segments of a single segment tree in a depth type scan.

Bulk file verification identifies the missing segments and their corresponding files in the file system. In bulk file verification, the files may be verified in two parts in one example. In the first part, missing segments are identified using a top-down breadth first walk (top down scan). In the second part, files corresponding to the missing segments are identified using a bottom-up breadth first walk (bottom up scan). The top down breadth scan checks the reachability of the segments from their segment references and the bottom up scan is used to find the files corresponding to those missing segments.

For example, the container set (which is a set of containers that stores the segments associated with the files) is scanned based on the levels of the segment trees. Rather than scanning or walking a particular file, the same levels of the segment trees of multiple files are scanned or walked in succession. The segment references are obtained and the segment references or the identifiers in these segment references may be stored in memory.

More specifically, the containers in storage (the container set) are scanned level by level from L6 to L1 (top down) to obtain the segment references and store the identifiers (e.g., a hash, key, reference or fingerprint) of these segment references in memory. Next, a determination is made as to whether the identifiers obtained from the segment references identified during the breadth first walk exist in the containers. This can be done by walking the containers directly to match the segment references against the actual segments. If the file system can also maintain a one to one mapping between the index and the container segments, the index can be used instead of the containers. This will usually result in much better performance as the index is a much more compact data structure. If the identifier is not found in the index, then the segment is considered to be a missing segment. Once missing segments have been identified, the missing segments can be mapped to their corresponding files by walking the segment trees bottom-up in a breadth manner.

This approach can be adapted to account for memory limitations. In one example, the identifiers obtained from the segment references may be inserted into an in-memory hash table. When the hash table is full or fuller than a threshold level, the contents of the hash table may be written to disk. Multiple hash tables may be written to disk. The missing segments can be identified by comparing or differencing the hash tables with the index. The difference can be performed by sequentially scanning the index and the container set. Sequential scans can improve performance.

Figure 2:
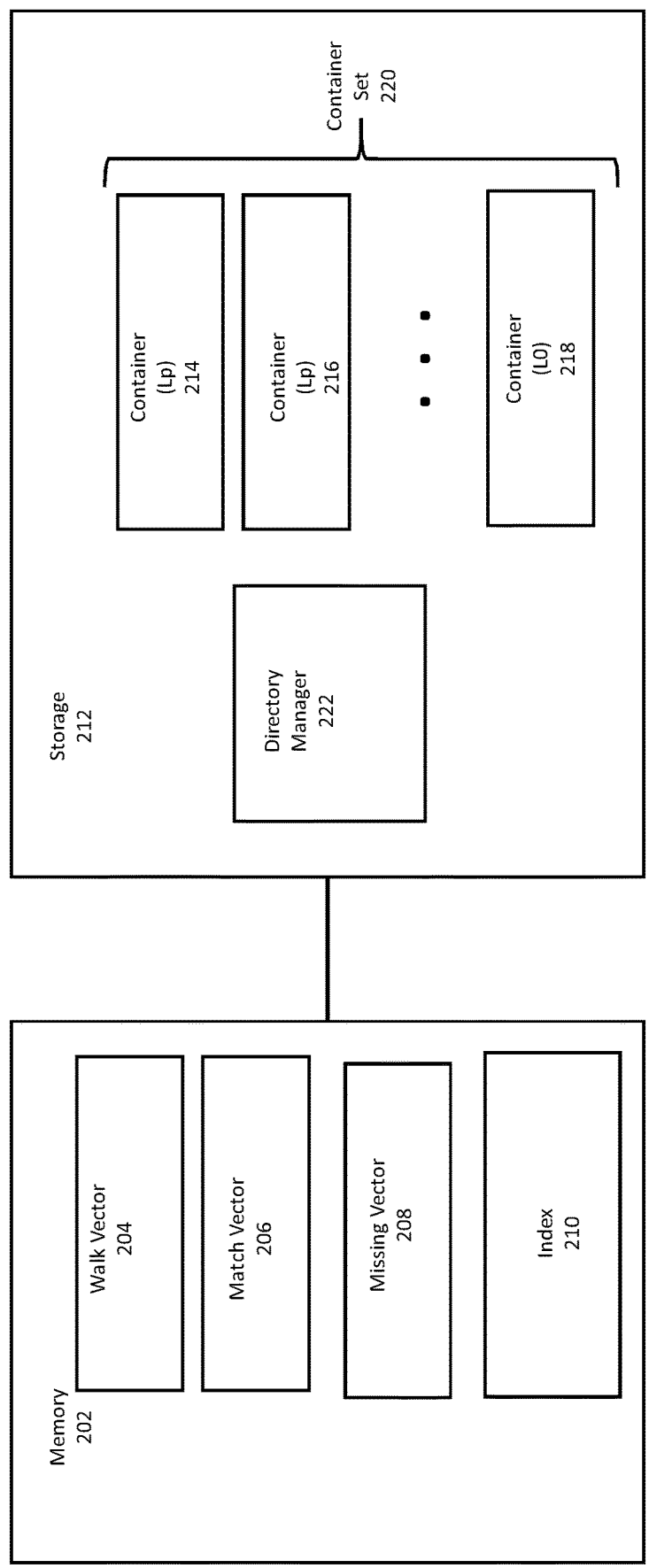
FIG. 2 illustrates an example of a computing system that stores data.

FIG. 2 illustrates an example of a computing system in which bulk file system verification is performed. FIG. 2 illustrates a storage 212 (e.g., a hard disk, group of hard disks, flash drive, SSD, DRAM, or other storage arrangement, or combination thereof). The storage 212 includes a directory manager 222 and a container set 220. The container set includes, by way of example and for explanation, containers 214, 216, and 218. In this example, the containers in the container set 220 may each store segments from the same level. For example, the container 214 may store L6 segments. The container 216 may store L5 segments. The container 218 may store L0 segments. The container set 220 includes multiple containers. Multiple containers may be needed for each segment level. There are containers for each of the levels of the segment trees in one embodiment.

Alternatively, one of the containers may store segments from two or more levels of the segment trees.

When performing bulk file verification, a breadth first physical scan (top down scan) is performed to identify the missing segments. To perform the top down scan, several vectors may be placed or instantiated in memory. The top down scan may use a walk vector 204, a match vector 206, and a missing vector 208. The walk vector 204 may be implemented as a bloom filter. The match vector 206 may be an in-memory 202 hash table of identifiers obtained from the segment references. The missing vector 208 may be implemented as a hash table that stores all the missing segments. For example, the missing vector 208 may store identifiers of missing segments. As previously discussed, a missing segment may be determined in different ways.

In this example, L(i) represents a segment tree level where 0<i<=6 and the directory manager 222 contains references to L6 segments that are live or active inside the file system. The top down scan begins by creating a bloom filter for the walk vector. The directory manager 222 is walked to identify all of the L(6) segments and to add their segment references (or identifiers contained therein) to the walk vector 204 and the match vector 206. Next, the container set 220 is walked and scanned for L(i). For all L(i) in the container set that are also are present in the walk vector, the L(i-1) references or identifiers included in the L(i) segments are added to the walk vector and to the match vector.

This procedure of scanning the tree levels is repeated by setting i=i-1. The result of this process is that the L(6) segments are scanned for references to L(5) segments, the L(5) segments are scanned for references to L(4) segments, the L(4) segments are scanned for references to L(3) segments, the L(3) segments are scanned for references to L(2) segments, the L(2) segments are scanned for references to L(1) segments, and the L(1) segments are scanned for references to L(0) segments. References identified by this breadth walk of the segment trees are stored in both the walk vector 204 and the match vector 206.

The match vectors are compared with the index 210. This may be performed once the allotted space (memory) is full or at another time. The match vectors 206 can be compared (e.g., differenced) with the index 210 in other manners and at various appropriate times. All of the segments from the L(0) level that are not present are added to the missing vector 208 (which may be a hash table).

More specifically, the walk vector 204 is used to traverse the segment trees of all the files or a subset of files in a breadth first manner. The walk vector 204 could also be specific to a container set or range of containers. After walking the directory manager 222 to obtain all of the live or active L(6) segments and add the L(6) references to the walk vector and the match vector, the container set 220 is scanned for L(6) segments and matched against the ones present in the match vector. For all L(6) segments identified in the scan, their L(5) segment references are read and inserted into the walk vector 204. The bloom filter can be used as a compact representation of the L(p) fingerprints, wherein L(p) generally represents the levels of the segment trees. Even though the bloom filter might have false positives, it will only result in verifying some dead identifiers or segments. But even dead identifiers should be present in the index. Consequently, using a bloom filter as the walk vector 204 may result in verifying more segments than needed.

If it is necessary to dump the segment references (or portion thereof) to disk, the segment references can be compared against entries in the index 210. When the segment references are dumped or written to disk, the process of comparing entries (or performing a differential process) includes reading identifiers bucket by bucket from each of the hash tables and checking against the corresponding bucket of the index. If an identifier is present in the hash table but is not present in the index, the corresponding segment is considered to be missing. A missing identifier is inserted into a separate missing segment hash table or missing vector 208. This allows all missing L(0) segments to be identified. As previously stated, a missing segment is, by way of example and not limitation, (i) one where an identifier is present in the index, but the segment is not present in any container, (ii) a segment is written to a container, but there is no identifier entry in the index, and (iii) the segment is not in the container set or in the index, but a reference or identifier is found in the segment tree.

After finishing the top down scan and identifying all missing L(0) segments, the bottom up scan is performed in a similar breadth manner. The bottom up scan identifies the files that correspond to the missing segments identified during the top down scan.

The bottom up scan is performed by initially walking the container set 220 to read containers that contain L(1) segments or to read only L(1) segments in the container set. For each L(1) segment, the L(0) references are read and compared against the entries in the missing vector 208. Segment references or identifiers of all the L(1)s whose L(0) reference(s) match the missing vector 208 are added to the same missing vector 208. A similar process is performed for levels greater that L(1). For example, for each L(2) segment, the L(1) references are read and compared against the entries in the missing vector 208. Segment references or identifiers of all the L(2) segments whose L(1) references match the missing vector 208 are added to the missing vector 208. Levels L(3)-L(6) are similar processed to add segment references or identifiers of segments levels L(3)-L(6).

Once level L(6) is reached, the namespace is walked to find or identify the files corresponding to the L(6) segment references or identifiers included in the missing vector 208. For all of these files, the filenames corresponding to the missing segments are reported.

More specifically, once the missing segments are identified by the top-down breadth scan, the missing segments (or identifiers thereof) are inserted into missing segment hash table (missing vector 208). After that, a level by level breadth-first scan is performed bottom-up from L(1) up until L(6)s.

The container set 220 is scanned for L(1) segments and, for each L(0) segment reference found in an L(1) segment, the L(0) segment reference is checked against the missing vector 208. If the missing segment reference or identifier matches with the missing vector 208, then the segment reference or identifier of the corresponding L(1) segment is inserted into the missing vector 208.

Once scanning the container set for L(1) segments is completed, the container set 220 is scanned for L(2) segments. If any L(1) segment references in the L(2) segments match an entry in the missing vector 208, the segment reference or identifier of the corresponding L(2) segment is added to the missing vector 208. This continues until top of the segment trees is reached.

Once missing L(6) segments or any L(6) segments that have some missing segments underneath them are found or identified, a namespace scan is done to find the files names corresponding to those L(6) segments.

The comparison or difference between the index and the container set can be done using sequential scans that results in good performance because of sequential disk input output. Further, embodiments of the invention are less likely to verify an L(6) segment or an L(0) segment multiple times even when the same segment can be referenced by other segments due to de-duplication.

As previously stated, a hash table may be dumped to memory when the hash table is full. However, there are situations when this may not be performed. For example, when there is no available disk space or the target dataset is small enough that it fits in memory. For example, the bulk file verification discussed herein could be performed while excluding L(0) reference verification.

Instead of dumping the hash table to disk, the hash table can be compared against the index when the hash table is full. Missing segments in the index will be saved in the missing vector. Then the file verification process continues from the next segment in the L(p) segment tree. Because the number of L(p) segment references should not be very large, only a few index scans are required.

Figures 3, 4:
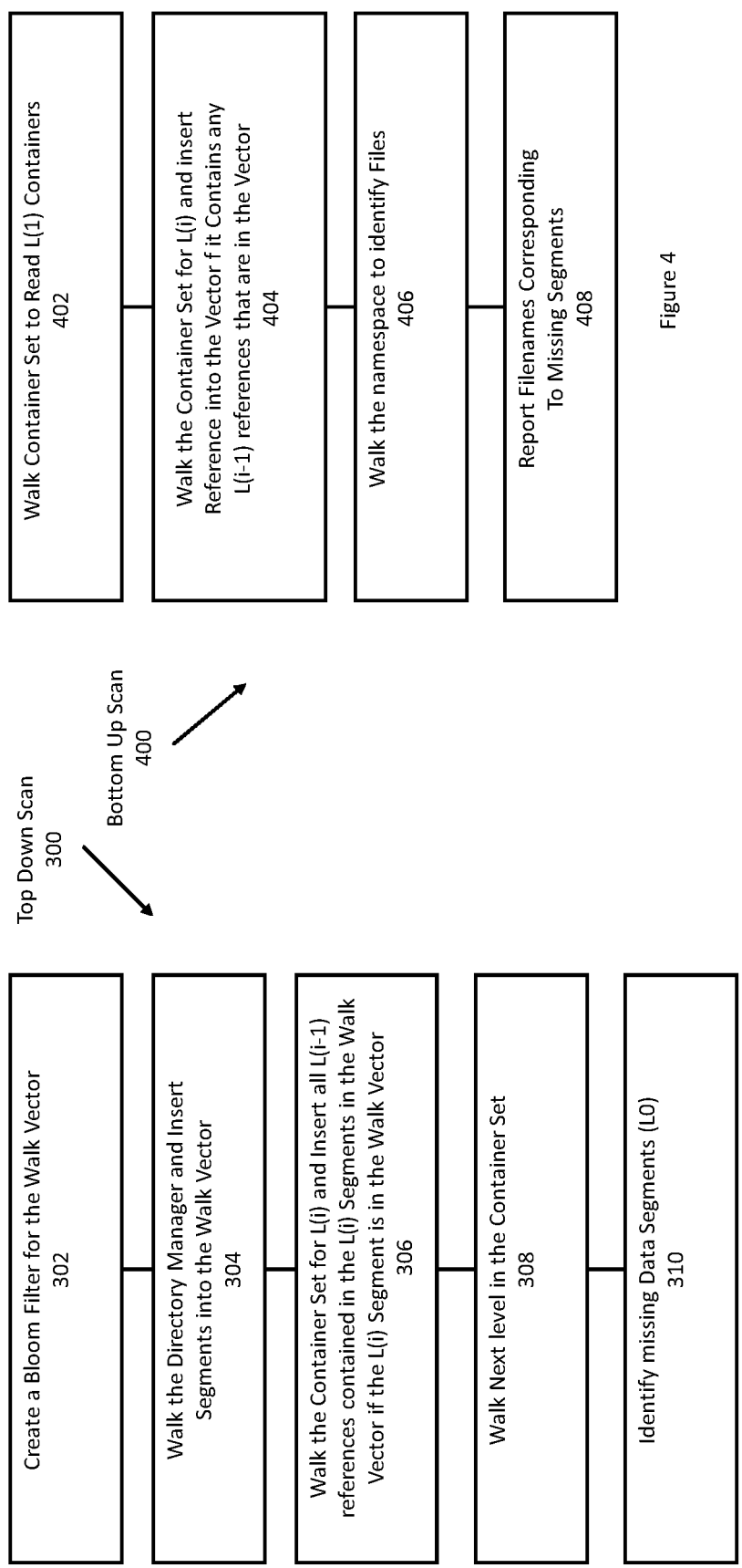
FIG. 3 illustrates a method for discovering missing segments in the data stored in the computing system.
FIG. 4 illustrates and example of a method for identifying the files associated with the missing segments.

FIG. 3 is an example of a top down scan method 300. In box 302, a bloom filter is created for a walk vector. The walk vector or bloom filter is used to store segment references or identifiers of segments identified during a walk of the file system in a breadth wise manner. In box 304, the directory manager is walked. The directory manager identifies all L(6) segments that are active in the file system. The identifiers of the L(6) segments may be added to the walk vector and/or a match vector.

In box 306, the file system is walked for L(i). In this example, i is initially equal to 6. More specifically, the segments are stored in containers and all L(6) segments are walked. Only containers containing L(6) segments need be walked. The L(6) segments include L(i-1) or L(5) references. The L(i-1) or L(5) references or identifiers are added to the walk vector and/or the match vector.

In box 308, the next level is walked. Stated differently i is decremented to 5 and the L(5) segments are walked to identify the L(i-1) or L(4) segment references or identifiers, which are placed in the walk vector and/or the match vector. Box 308 is repeated until i=1 so that references to or identifiers of the L(0) segments can be added to the walk vector and/or the match vector.

In box 310, missing segments L(0) are identified and added to the missing vector 208. Missing L(0) segments can be identified by comparing the match vector 206 with the index 210. As previously stated, (i) a missing segment is one where an identifier is present in the index, but the segment is not present in any container, (ii) a segment is written to a container, but there is no identifier entry in the index, and (iii) a segment is not in the container set or in the index, but a reference or identifier is found in the segment tree.

The method 300 allows missing segments to be identified in a top down manner where the files are evaluated or verified in bulk by walking multiple segment trees at the same time.

FIG. 4 illustrates a method for identifying the files corresponding to the missing segments L(0). In box 402, the container set is walked to read L(1) containers. In other words, because L(1) containers contain L(1) segments, this is a way to read the L(1) segments.

As the L(1) containers are walked, the L(i-1) or L(0) references or identifiers are read and matched against the missing vector 208. If there is a match, this means that the L(0) segment is a missing segment and the L(1) reference or identifier is added to the missing vector. Next, i is incremented and, in box 404, the container set is walked for L(i) (i is now equal to 2). Segment references or identifiers of L(i) (L(2) currently)) segments, whose L(i-1) or L(1) references match entries in the missing vector, are added to the missing vector. In other words, the L(2) level is walked and L(2) segment references or identifiers are added to the missing vector when their L(i-1) references are present in the missing vector. Of the steps or acts of box 404 is continued or repeated for subsequent levels until L(6) is reached and the L(6) segment references or identifiers are added to the missing vector as appropriate.

In box 406, the namespace is walked to identify files corresponding to L(6) segment references that have been added to the missing vector. In box 408, the file names corresponding to the missing segments are identified. The procedure for handling these files may vary. The procedure may include re inserting the missing file into the container set, reconstructing the file if possible, performing garbage collection on the missing segments as appropriate, or the like or combination thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for verifying files in bulk in a computing system, the method comprising:
    performing a top down segment breadth walk in each of multiple segment trees to identify missing segments in a file system;
    performing a bottom up segment breadth walk in each of the multiple segment trees to identify files corresponding to the missing segments; and
    performing an action each of the identified files, wherein the action includes one of reinserting the missing files into the file system, reconstructing the missing files, or performing garbage collections on the missing segments.

2. The method of claim 1, wherein each segment tree includes multiple levels, wherein a bottom level corresponds to data segments and wherein levels above the bottom level correspond to metadata segments.

3. The method of claim 2, wherein the metadata segments of a particular level are mostly stored in the same container and metadata segments of different levels of the segment trees are mostly stored in different containers such that random IOs are reduced and such that the containers, during the top down segment breadth walk and the bottom up segment breadth walk can be read sequentially.

4. The method of claim 3, wherein the segment tree includes a level L(0) for the data segments and levels L(1)-L(6) for metadata segments.

5. The method of claim 1, wherein the top down segment breadth walk uses a walk vector, a match vector and a missing vector, wherein the match vector includes identifies obtained from segment references and the missing vector stores identifies of missing segments.

6. The method of claim 5, further comprising walking a directory manager to add all top level references to the walk vector, wherein references identified during the top down segment breadth walk are included in the walk vector and the match vector.

7. The method of claim 6, further comprising identifying comparing the match vector with an index and adding missing data segments to the missing vector.

8. The method of claim 7, wherein the bottom up segment breadth walk is configured to identify segments whose identifiers are associated with the segments in the missing vector.

9. The method of claim 8, further comprising walking a namespace to identify files corresponding to top level segments placed in the missing vector by the bottom up segment breadth walk, wherein filenames corresponding to the missing segments are identified.

10. A non-transitory storage medium having stored therein instructions that are executable by one or more hardware processors to perform operations for verifying files in bulk in a computing system, the operations comprising:
    performing a top down segment breadth walk in each of multiple segment trees to identify missing segments in a file system;
    performing a bottom up segment breadth walk in each of the multiple segment trees to identify files corresponding to the missing segments; and
    performing an action each of the identified files, wherein the action includes one of reinserting the missing files into the file system, reconstructing the missing files, or performing garbage collections on the missing segments.

11. The non-transitory storage medium of claim 10, wherein each segment tree includes multiple levels, wherein a bottom level corresponds to data segments and wherein levels above the bottom level correspond to metadata segments.

12. The non-transitory storage medium of claim 11, wherein the metadata segments of a particular level are mostly stored in the same container and metadata segments of different levels of the segment trees are mostly stored in different containers such that random IOs are reduced and such that the containers, during the top down segment breadth walk and the bottom up segment breadth walk can be read sequentially.

13. The non-transitory storage medium of claim 12, wherein the segment tree includes a level L(0) for the data segments and levels L(1)-L(6) for metadata segments.

14. The non-transitory storage medium of claim 10, wherein the top down segment breadth walk uses a walk vector, a match vector and a missing vector, wherein the match vector includes identifies obtained from segment references and the missing vector stores identifies of missing segments.

15. The non-transitory storage medium of claim 14, further comprising walking a directory manager to add all top level references to the walk vector, wherein references identified during the top down segment breadth walk are included in the walk vector and the match vector.

16. The non-transitory storage medium of claim 15, further comprising identifying comparing the match vector with an index and adding missing data segments to the missing vector.

17. The non-transitory storage medium of claim 16, wherein the bottom up segment breadth walk is configured to identify segments whose identifiers are associated with the segments in the missing vector.

18. The non-transitory storage medium of claim 17, further comprising walking a namespace to identify files corresponding to top level segments placed in the missing vector by the bottom up segment breadth walk, wherein filenames corresponding to the missing segments are identified.

\* \* \* \* \*